United States Patent [19]
Yajima

[11] Patent Number: 5,392,646
[45] Date of Patent: Feb. 28, 1995

[54] THERMAL TYPE OF FLOW RATE SENSOR
[75] Inventor: Yasuhito Yajima, Nagoya, Japan
[73] Assignee: NGK Insulators, Ltd., Nagoya, Japan
[21] Appl. No.: 836,884
[22] Filed: Feb. 19, 1992
[30] Foreign Application Priority Data
  Mar. 13, 1991 [JP] Japan .................. 3-074052
[51] Int. Cl.[6] .............................. G01F 1/68
[52] U.S. Cl. ................ 73/204.19; 73/204.27
[58] Field of Search ........... 73/204.18, 204.19, 204.25, 73/204.26, 204.27

[56] References Cited
U.S. PATENT DOCUMENTS

| | | | |
|---|---|---|---|
| 4,344,322 | 8/1982 | Plapp | 73/204.27 |
| 4,587,844 | 5/1986 | Sumal . | |
| 4,688,424 | 8/1987 | Handtmann et al. | 73/204.26 |
| 4,777,820 | 10/1988 | Hecht et al. . | |
| 4,831,876 | 5/1989 | Porth et al. | 73/204.16 |
| 4,916,948 | 4/1990 | Inada et al. . | |
| 5,024,083 | 6/1991 | Inada et al. | 73/204.26 |

FOREIGN PATENT DOCUMENTS

| | | |
|---|---|---|
| 0235360A1 | 3/1986 | European Pat. Off. . |
| 2843019A1 | 4/1980 | Germany . |
| 3941330A1 | 6/1990 | Germany . |
| 4024827A1 | 2/1991 | Germany . |
| 690300 | 10/1979 | U.S.S.R. . |
| 1437694A1 | 11/1988 | U.S.S.R. . |

OTHER PUBLICATIONS

J. Phys. E: Sci. Instrum. 19, pp. 739–743.
"Sensor Technology", vol. 9, No. 10, Sep. 1989. Partial translation of p. 25.
SAE Paper No. 800468. "Hot Wire Air Mass Meter – A New Air Flow Meter for Gasoline Fuel Injection Systems", Rudolf Sauer.
SAE Paper No. 840137. "Bosch Mass Air Flow Meter: Status and Further Aspects", Jaihind S. Sumal and Rudolf Sauer.

Primary Examiner—Stephen Chin
Assistant Examiner—Timothy J. May
Attorney, Agent, or Firm—Adduci, Mastriani, Schaumberg & Schill

[57] ABSTRACT

A thermal type of flow rate sensor includes heat-generating and temperature-compensating resistors $R_H$ and $R_C$ which are located within a fluid passage to measure the flow rate of the fluid. The linear term coefficient, $\alpha$, of the temperature coefficient of resistance of $R_C$ is made smaller than that of $R_H$, whereby any temperature-compensating electric circuit and circuit control can all be dispensed with and the flow rate of a fluid can be precisely detected over a wide temperature range.

2 Claims, 4 Drawing Sheets

THERMAL TYPE OF FLOW RATE SENSOR

BACKGROUND OF THE INVENTION

This invention relates generally to a thermal type of flow rate sensor and, more particularly, to a thermal type of flow rate sensor designed to measure the quantity of intake air in internal combustion engines.

As known so far in the art, the flow rate of air in automotive internal combustion engines is measured with, e.g., a thermal type of flow rate sensor including a heat generator in an intake suction passage, which is kept at a certain temperature, for instance 100° C. by current control, whereby the change in the amount of heat needed for the heat generator to be cooled is detected as a resistance change to determine the flow rate of air. In this regard, see "SENSOR TECHNOLOGY", September 1989, page 25. Such a flow rate sensor is controlled either at a constant temperature or with a constant current.

Such a thermal type of flow rate sensor, for instance, includes such an electric circuit as shown in FIG. 1. As illustrated, there are provided a heat-generating resistor $R_H$ and a temperature-compensating resistor $R_C$ which are in contact with the air within an air pipe 1, and resistors $R_1$ and $R_2$ are connected with the outside of an air passage 2 in the form of a bridge circuit. The heat-generating resistor $R_H$ is provided to measure the flow rate of air, while the temperature-compensating resistor $R_C$ is a resistor that is kept at the same temperature as that of the air in the air passage 2. For $R_H$ and $R_C$, resistors having resistance values of 10–30Ω and 400–1000Ω, respectively, are generally used. In FIG. 1, reference numeral 3 stands for a transistor; 4 a comparator; and 5 a terminal on which a sensor-driving voltage is impressed. While the bridge circuit is kept so well-balanced that the temperature of the resistor $R_H$ can be higher than the air temperature (i.e., the temperature of the resistor $R_C$), a heating current is supplied to the bridge circuit to keep the temperature of the resistor $R_H$ constant. Then, an output 6 corresponding to the flow rate of air can be obtained in the form of a voltage across $R_1$.

A problem with the conventional thermal type of flow rate sensor, however, is that it is difficult to detect the flow rate of air accurately, because the temperature-compensating resistor $R_C$ fails to make up for temperature accurately, resulting in an error in measuring the flow rate of air. One major reason would be that the electric circuit is designed without finding an accurate temperature coefficient of resistance of the heat-generating resistor of the conventional thermal type of flow rate sensor, as will be described later.

It is therefore an object of this invention to provide a thermal type of flow rate sensor which can dispense with not only such an electric circuit for temperature compensation as that used in the conventional thermal type of air flow-rate sensor but circuit adjustment as well and, nonetheless, can provide an accurate detection of the flow rate of a fluid over a wide temperature range.

SUMMARY OF THE INVENTION

According to this invention, the above object is achieved by the provision of a thermal type of flow rate sensor including a platinum heat-generating resistor $R_H$ to detect the flow rate of a fluid and a platinum temperature-compensating resistor $R_C$, both being located within a fluid passage, characterized in that:

when the resistance value, $r_H(\Omega)$, of said platinum heat-generating resistor $R_H$ is given by the following function of temperature, T(°C.):

$$r_H = r_{H0}(1+\alpha T+\beta T^2)$$

wherein $r_{H0}(\Omega)$ is the resistance value at 0° C. of said platinum heat-generating resistor $R_H$, and the resistance value, $r_C(\Omega)$, of said platinum temperature-compensating resistor $R_C$ is given by the following function of temperature, T(°C.):

$$r_C = r_{C0}(1+\alpha T+\beta T^2)$$

wherein $r_{C0}(\Omega)$ is the resistance value at 0° C. of said platinum temperature-compensating resistor $R_C$, the value of the linear term coefficient, $\alpha$, of the temperature coefficient of resistance of said platinum temperature-compensating resistor $R_C$ is smaller than the linear term coefficient, $\alpha$, of the temperature coefficient of resistance of said platinum heat-generating resistor $R_H$.

More preferably, the flow rate sensor of this invention is further characterized in that the value of the linear term coefficient, $\alpha$, of the temperature coefficient of resistance of said platinum temperature-compensating resistor $R_C$ is lower than the linear term coefficient, $\alpha$, of the temperature coefficient of resistance of said platinum heat-generating resistor $R_H$ by 100 ppm/°C. to 250 pm/°C.

BRIEF DESCRIPTION OF THE DRAWINGS

This invention will now be explained, by way of example alone with reference to the accompanying drawings, in which.

DETAILED DESCRIPTION OF THE INVENTION

Before explaining the preferred embodiments of this invention, the principles of a general-purpose thermal type of flow rate sensor will be refereed to briefly.

The amount of heat H(W), which a heat generator loses per unit time, is proportional to a difference between the temperature, $T_H$(°C.), of the heat generator and the temperature, $T_C$(°C.), of air, as given by $$H = (A + BQ^n)(T_H - T_c) \tag{1}$$

Here Q (kg/s) is the flow rate of a fluid, n is a number depending on the characteristic or Reynolds number of the fluid, and A and B are constants.

Now let I(A) and $r_H(\Omega)$ denote a heating current applied to the heat generator and the resistance value of the heat-generating resistor $R_H$, respectively. Under thermal equilibrium conditions, the following equation then holds:

$$H = r_H I^2 \qquad (2)$$

because the quantity of heat dissipation is equal to the quantity of heat generation.

Therefore, the following equation (3) holds:

$$I = \sqrt{\frac{(A + BQ^n)(T_H - T_C)}{r_H}} \qquad (3)$$

Then, the output is given by the following equation (4):

$$r_1 I = r_1 \sqrt{\frac{(A + BQ^n)(T_H - T_C)}{r_H}} \qquad (4)$$

If there is a change in the temperature, $T_C$, of air while the flow rate of the fluid remains invariable. (Q=constant), $(T_H - T_C)/r_H \ldots$ (5) should be constant so as to keep the flow rate sensor output invariable, i.e., achieve temperature compensation.

Figure 1:
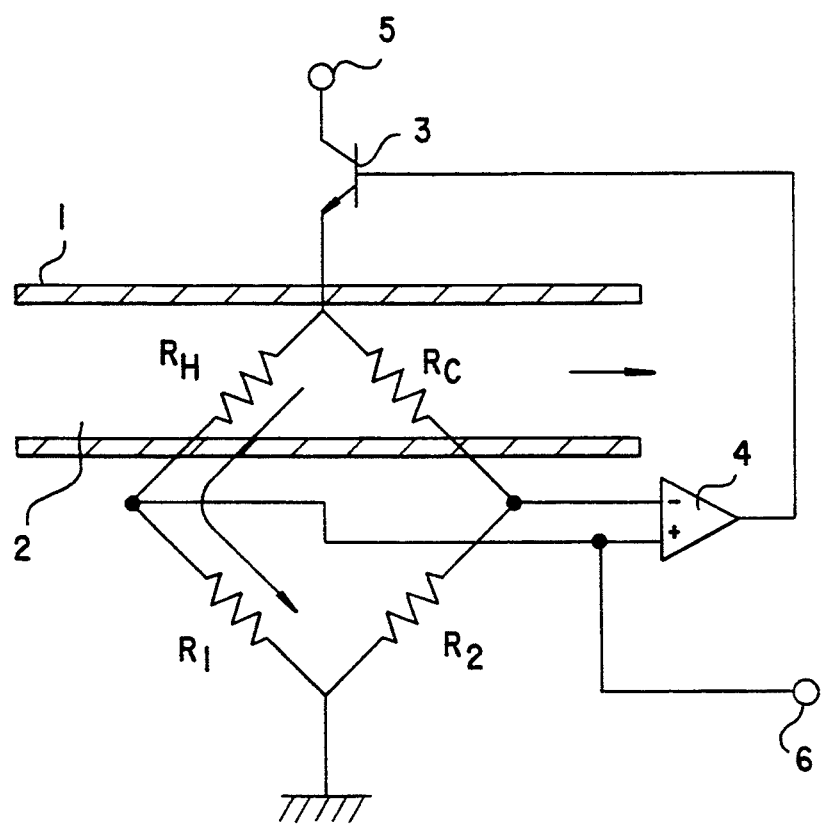
FIG. 1 is a circuit diagram of a preferred embodiment of the thermal type of flow rate sensor according to this invention.

When the bridge shown in FIG. 1 is well-balanced, there is such a relation as given by $$r_H r_2 = r_C r_1 \qquad (6)$$

Here $r_C$ is the resistance value in $\Omega$ (ohms) of the temperature-compensating resistor $R_C$, $r_1$ is the resistance value in $\Omega$ of the resistor $R_1$, and $r_2$ is the resistance value in $\Omega$ of the resistor $R_2$.

Now suppose that $R_H$ and $R_C$ have such temperature coefficients as given by $$r_H(T) = r_{HO}(1 + \alpha_H T) \qquad (7)$$

and $$r_C(T) = r_{CO}(1 + \alpha_C T) \qquad (8)$$

Here $r_{HO}$ and $r_{CO}$ are the resistance values in $\Omega$ of $R_H$ and $R_C$ at 0° C., respectively. From $T_H$ and $T_C$, the temperatures of $R_H$ and $R_C$ are found by $$r_H = r_{HO}(1 + \alpha_H T_H) \qquad (9)$$

and $$r_C = r_{CO}(1 + \alpha_C T_C) \qquad (10)$$

Substituting the thus found $T_H$ and $T_C$ for Equation (4) gives the following equation (11):

$$\frac{T_H - T_C}{r_H} = \frac{1}{\alpha_H r_{HO}} - \frac{r_2}{\alpha_C r_{CO} r_1} + \frac{1}{r_H}\left(\frac{1}{\alpha_C} - \frac{1}{\alpha_H}\right) \qquad (11)$$

In order that the left term of Equation (11) is constant (for the purpose of temperature compensation), $\alpha_H$ must be equal to $\alpha_C$.

Therefore, the heat-generating resistor $R_H$ and temperature-compensating resistor $R_C$ are required to have the same temperature coefficient as that given by $$\alpha = (\alpha_H = \alpha_C) \qquad (12)$$

To put it another way, the following equations (13) and (14) must be met:

$$r_H = r_{HO}(1 + \alpha T) \qquad (13)$$

$$r_C = r_{CO}(1 + \alpha T) \qquad (14)$$

For temperature compensation, the heat-generating and temperature-compensating resistors $R_H$ and $R_C$ of a conventional thermal type of flow rate sensor have so far been formed of platinum, thereby making the temperature coefficients of resistance of both equal to each other.

Why the conventional sensor gives rise to errors in measurements would be accounted for by the fact that the heat-generating and temperature-compensating resistors $R_H$ and $R_C$ are chosen on the assumption that Equations (7) and (8) are correct.

According to this invention, the heat-generating and temperature-compensating resistors $R_H$ and $R_C$ are selected in consideration of the fact that the resistance value of platinum is indeed given by an equation approximate to the following equation (15). As will be understood from the experimental data to be referred to later, this makes accurate flow-rate measurement possible, even when there is a temperature change. Bear in mind that Equation (15) is derived by adding a compensating second-order term coefficient, $\beta$, to the term $T^2$ of Equation (13).

$$r_H = r_{HO}(1 + \alpha T + \beta T^2) \qquad (15)$$

Figure 2:
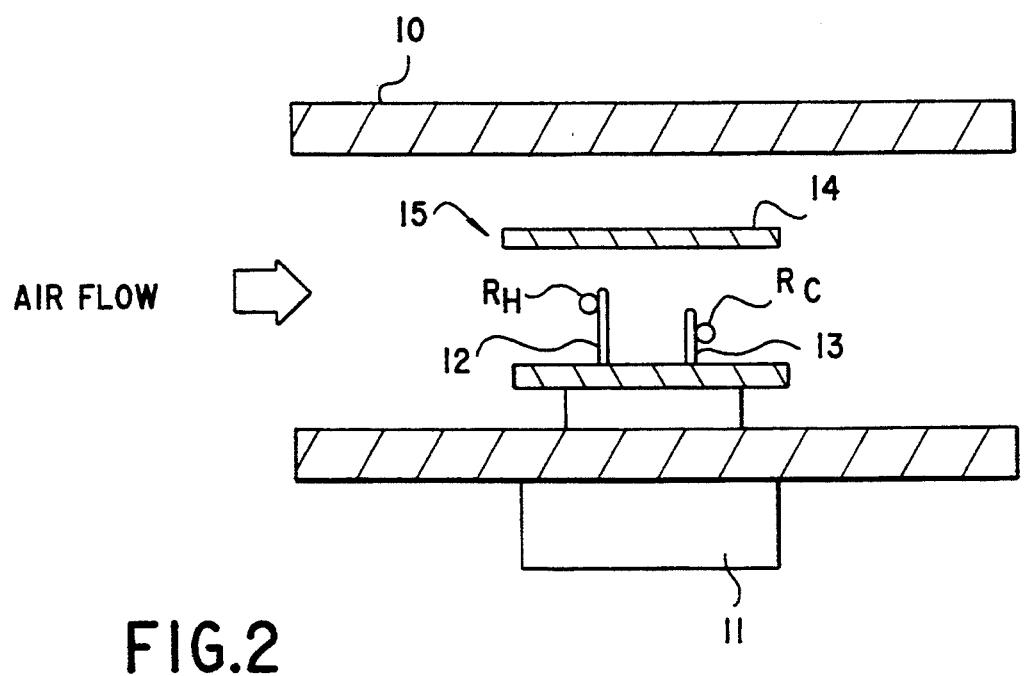
FIG. 2 is a schematic view of the preferred embodiment of the thermal type of flow rate sensor according to this invention.

Referring now to FIG. 2 that illustrates one embodiment of the sensor for detecting the flow rate of air in an internal combustion engine, to which this invention is applied, an air pipe includes a sampling pipe 14, within which heat-generating and temperature-compensating resistors $R_H$ and $R_C$ are located. These resistors $R_H$ and $R_C$ are connected to an electronic circuit 11 through electrically conductive supports 12 and 13, respectively.

Figure 3:
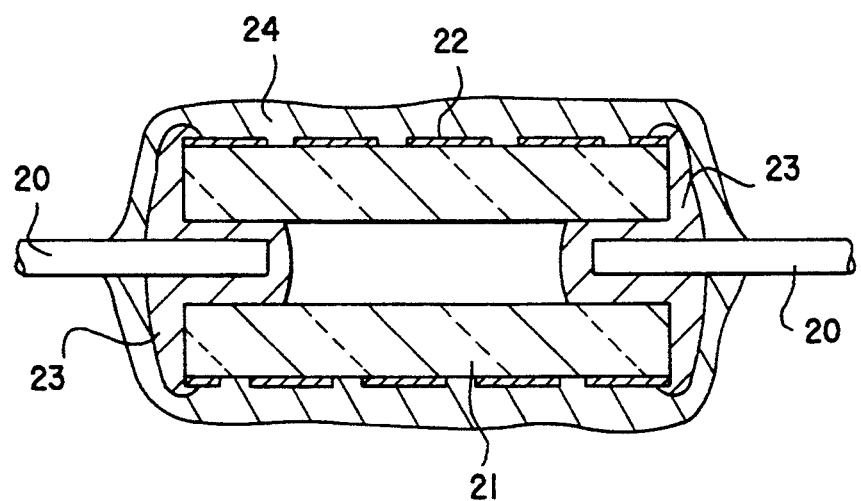
FIG. 3 is schematic view of the resistor used in the preferred embodiment of this invention.

The electric circuit of a thermal type of flow rate sensor 15 is illustrated in FIG. 1. As illustrated in FIG. 3, each of the resistors $R_H$ and $R_C$, which are bridge components forming this circuit, has a thin-film structure.

A ceramic pipe 21 formed of, e.g., alumina is provided on its outer surface with a patterned thin film 22, which has a given resistance value and is formed of a metal, like platinum. At both ends of the ceramic pipe 21, the thin film 22 is electrically connected with platinum leads 20 and 20 through electrically conductive pastes 23 and 23 obtained by mixing conductors formed of, e.g., platinum with such a material as glass. The metallic thin film 22 on the outer surface of the ceramic pipe 21 may be formed by physical or chemical procedures such as sputtering, plating, CVD or vapor deposition, heat treatments and laser trimming or other method which gives a predetermined spiral pattern. Around the metallic thin film 22, there is an insulating protective film 24 having a given thickness, which is formed of glass, for instance. The heat-generating and temperature-compensating resistors $R_H$ and $R_C$ are adjusted to resistance values of 10–30Ω and 400–1000Ω, respectively, by varying the spirals' pitches. The value of the linear term coefficient, $\alpha$, of the temperature coefficient of resistance of the temperature-compensating resistor $R_C$ is then smaller than that of the heat-generating resistance $R_H$. As will be appreciated from the experimental data to be referred to later, it is thus possible to obtain constant sensor outputs, if the flow rate remains constant regardless of a temperature change.

It is here to be noted that the linear term coefficient, $\alpha$, of the temperature coefficient of resistance may be placed under control by varying either the thickness of the above metallic thin film or the above heat-treatment conditions. It is also understood that any variation in these conditions hardly affects the quadratic term coefficient, $\beta$, of the temperature coefficient of resistance.

The present invention will now be explained in greater details with reference to the experimental data.

EXAMPLE 1

At a fluid temperature of 0° C., the heat-generating resistor $R_H$ was heated to 100° C.

The resistance values of the heat-generating and temperature-compensating resistors $R_H$ and $R_C$ in this example are given by $$r_H = r_{H0}(1 + 3801 \times 10^{-6}T - 0.60 \times 10^{-6}T^2) \text{ and}$$
$$r_C = r_{C0}(1 + 3682 \times 10^{-6}T - 0.60 \times 10^{-6}T^2) \quad (16)$$

On the other hand, the resistance values of the heat-generating and temperature-compensating resistors $R_H$ and $R_C$ in this comparative example are given by $$r_H = r_{H0}(1 + 3801 \times 10^{-6}T - 0.60 \times 10^{-6}T^2) \text{ and}$$
$$r_C = r_{C0}(1 + 3803 \times 10^{-6}T - 0.61 \times 10^{-6}T^2) \quad (17)$$

Figure 4A:
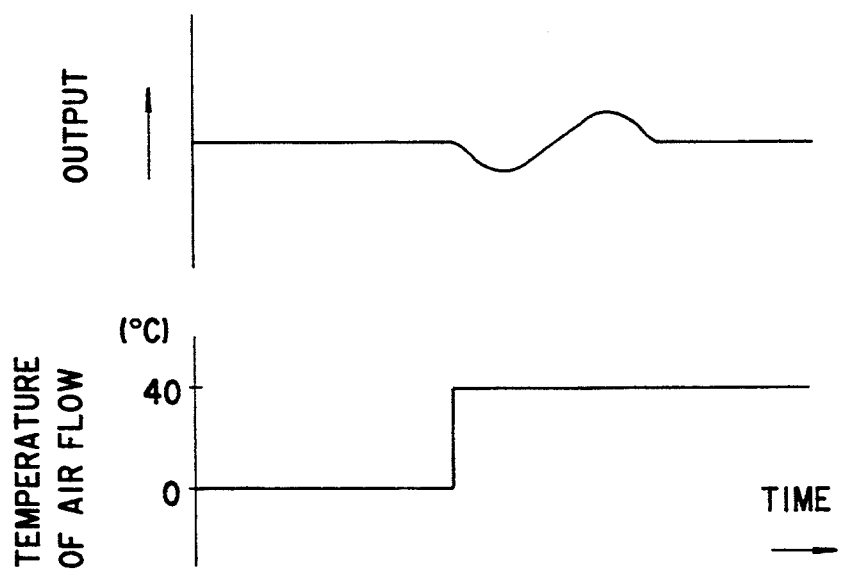
FIGS. 4A and 4B are characteristic diagrams of Example 1 of this invention and Comparative Example 1, respectively which are provided for the purpose of comparison.
Figure 4B:
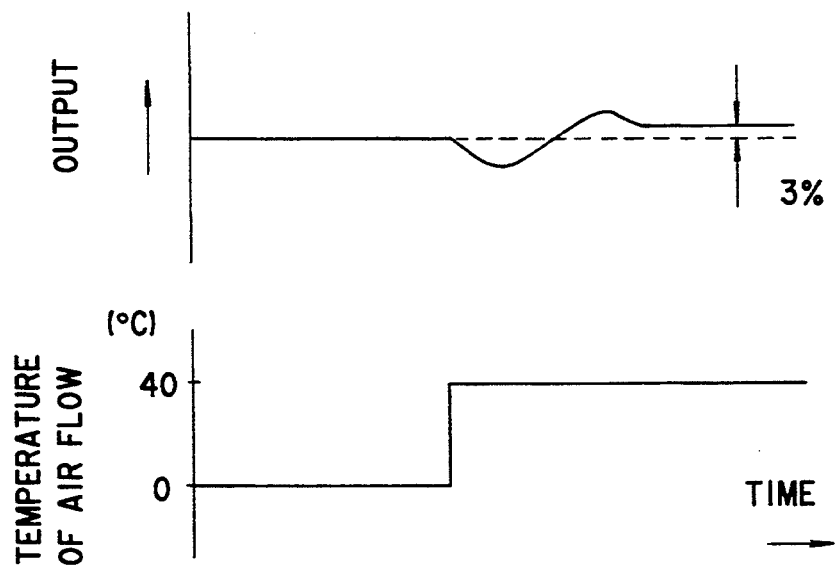

FIGS. 4A and 4B show what output changes occurred in Example 1 and Comparative Example 1 when the fluids' temperatures were increased from 0° C. to 40° C. As will be best seen from FIG. 4B, the sensor according to Comparative Example 1 gave rise to an output error of about 3% before and after heating, when the fluid's temperature was increased from 0° C. to 40° C. By contrast, there was little or no output error in Example 1. This is because the resistor $R_H$ and $R_C$ used in Comparative Example 1 were approximate to each other in the linear term coefficient, $\alpha$, of the temperature coefficient of resistance, whereas there was a certain difference in $\alpha$ between the resistors $R_H$ and $R_C$ used in Example 1; as can be understood from FIG. 4A, the sensor according to this invention is much more improved in terms of sensitivity.

EXAMPLE 2

At a fluid temperature of 0° C., the heat-generating resistor $R_H$ was heated to 200° C.

The resistance values of the heat-generating and temperature-compensating resistors $R_H$ and $R_C$ in this example are given by $$r_H = r_{H0}(1 + 3801 \times 10^{-6}T - 0.60 \times 10^{-6}T^2) \text{ and}$$
$$r_C = r_{C0}(1 + 3560 \times 10^{-6}T - 0.59 \times 10^{-6}T^2) \quad (18)$$

On the other hand, the resistance values of the heat-generating and temperature-compensating resistors $R_H$ and $R_C$ in this comparative example are given by $$r_H = r_{H0}(1 + 3801 \times 10^{-6}T - 0.60 \times 10^{-6}T^2) \text{ and}$$
$$r_C = r_{C0}(1 + 3803 \times 10^{-6}T - 0.61 \times 10^{-6}T^2) \quad (19)$$

Figure 5A:
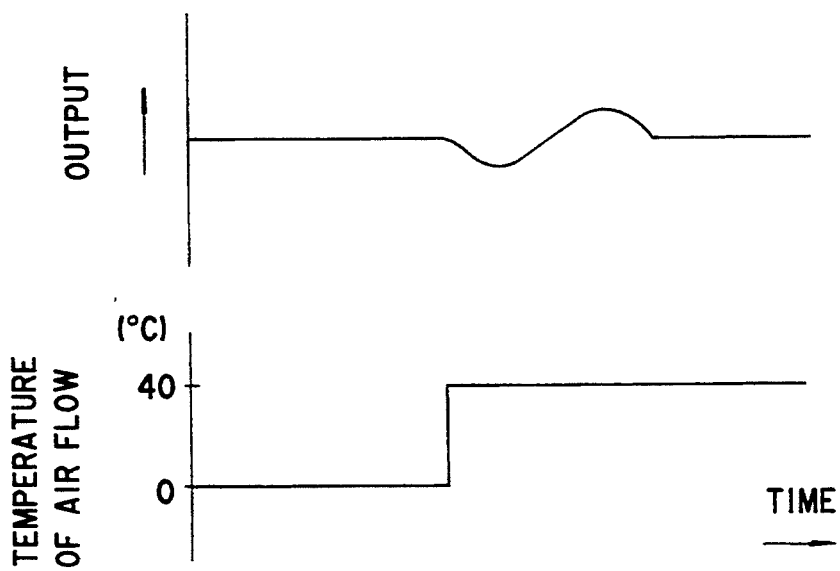
FIGS. 5A and 5B are characteristic diagrams of Example 2 of this invention and Comparative Example 2, respectively which are provided for the purpose of comparison.
Figure 5B:
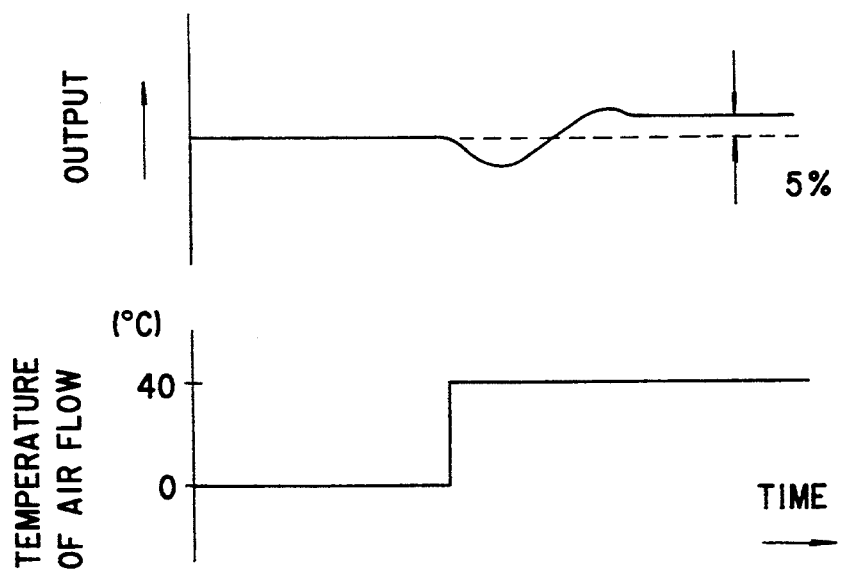

FIGS. 5A and 5B show what output changes occurred in Example 2 and Comparative Example 2 when the fluids' temperatures were increased from 0° C. to 40° C. As will be best seen from FIG. 5B, the sensor according to Comparative Example 2 gave rise to an output error of about 5% before and after heating, when the fluid's temperature was increased from 0° C. to 40° C. By contrast, there was little or no output error in Example 2. This is because the resistors $R_H$ and $R_C$ used in Comparative Example 2 were approximate to each other in the linear term coefficient, $\alpha$, of the temperature coefficient of resistance, whereas there was a certain difference in $\alpha$ between the resistors $R_H$ and $R_C$ used in Example 2; the sensor according to this invention is much more improved in terms of sensitivity.

According to this invention wherein, as already explained, the temperature coefficient value of resistance of the temperature-compensating resistor is made smaller than that of the heat-generating resistor within a given range, it is possible to provide a less-dependent-on-temperature, accurate detection of the flow rate of a fluid, even when there is a change in the fluid's temperature. In addition, the thermal type of flow rate sensor according to this invention has another merit of making sensor output control easy, because any special electric circuit or circuit control can be dispensed with.

I claim:

1. In a thermal flow rate sensor having a heat-generating resistor and a temperature-compensating resistor both positioned within a fluid passage and used in sensing flow rate of a fluid in the passage, the improvement comprising:

a platinum heat-generating resistor $R_H$ for detecting the flow rate of the fluid within the passage; and a platinum temperature-compensating resistor $R_C$ coupled to said platinum heat-generating resistor $R_H$ in contact with the fluid in the passage;

wherein the resistance value $r_H(\Omega)$, of said platinum heat-generating resistor $R_H$ is given by the following function of temperature of fluid in the passage, $T(°C.)$:

$$r_H = r_{H0}(1 + \alpha_H T + \beta_H T^2),$$

wherein $r_{H0}(\Omega)$ is the resistance value at 0° C. of said platinum heat-generating resistor $R_H$, $\beta_H$ is a second-order term coefficient, and $\alpha_H$ is a linear first-order term coefficient of a temperature coefficient of resistance of said platinum heat-generating resistor $R_H$; and wherein the resistance value, $r_C(\Omega)$, of said platinum temperature-compensating resistor $R_C$ is given by the following function of temperature of fluid in the passage, $T(°C.)$:

$$r_C = r_{C0}(1 + \alpha_C T + \beta_C T^2).$$

wherein $r_{C0}(\Omega)$ is the resistance value at 0° C. of said platinum temperature-compensating resistor $R_C$, $\beta_C$ is a second-order term coefficient, and $\alpha_C$ is a value of the linear first-order term coefficient of a temperature coefficient of resistance of said platinum temperature-compensating resistor $R_C$, and wherein the value of the linear first-order term coefficient, $\alpha_C$, of the temperature coefficient of resistance of said platinum temperature-compensating resistor $R_C$ is smaller than the linear first-order term coefficient, $\alpha_H$, of the temperature coefficient of resistance of said platinum heat-generating resistor $R_H$ by 100 ppm/°C. to 250 ppm/°C.

2. The thermal flow rate sensor as claimed in claim 1, wherein the fluid passage is part of an internal combustion engine, and the fluid in the passage is air.

* * * * *